United States Patent
Kim et al.

(10) Patent No.: US 11,309,564 B2
(45) Date of Patent: Apr. 19, 2022

(54) METHOD FOR MANUFACTURING REINFORCED SEPARATOR, REINFORCED SEPARATOR MANUFACTURED USING THE SAME AND REDOX FLOW BATTERY

(71) Applicant: LG CHEM, LTD., Seoul (KR)

(72) Inventors: Sungyeon Kim, Daejeon (KR); Tae Geun Noh, Daejeon (KR); Sikwon Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 296 days.

(21) Appl. No.: 16/489,665

(22) PCT Filed: Jan. 8, 2019

(86) PCT No.: PCT/KR2019/000241
§ 371 (c)(1),
(2) Date: Aug. 28, 2019

(87) PCT Pub. No.: WO2019/139320
PCT Pub. Date: Jul. 18, 2019

(65) Prior Publication Data
US 2020/0119382 A1    Apr. 16, 2020

(30) Foreign Application Priority Data
Jan. 10, 2018   (KR) .................. 10-2018-0003222

(51) Int. Cl.
*H01M 8/1044* (2016.01)
*H01M 8/1086* (2016.01)
(Continued)

(52) U.S. Cl.
CPC ....... *H01M 8/1044* (2013.01); *H01M 8/1058* (2013.01); *H01M 8/1086* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 5,830,603 A | 11/1998 | Oka et al. | |
| 6,156,451 A | 12/2000 | Banerjee et al. | |
| (Continued) | | | |

FOREIGN PATENT DOCUMENTS

| | | |
|---|---|---|
| CN | 102093584 A | 6/2011 |
| CN | 103718360 A | 4/2014 |
| (Continued) | | |

OTHER PUBLICATIONS

International Search Report for PCT/KR2019/000241 (PCT/ISA/210) dated Apr. 23, 2019, with English translation.

*Primary Examiner* — Tracy M Dove
(74) *Attorney, Agent, or Firm* — Birch, Stewart, Kolasch & Birch, LLP

(57) ABSTRACT

A method for manufacturing a reinforced separator including pretreating a porous support using a first solution including a first ionic polymer and ethanol; and impregnating a second solution including a second ionic polymer and a solvent into the pretreated porous support, wherein a concentration of the first ionic polymer in the first solution is lower than a concentration of the second ionic polymer in the second solution, a reinforced separator manufactured using the same, and a redox flow battery.

10 Claims, 5 Drawing Sheets

(51) Int. Cl.
*H01M 8/18* (2006.01)
*H01M 8/1058* (2016.01)

(56) References Cited

U.S. PATENT DOCUMENTS

| | | | |
|---|---|---|---|
| 6,562,446 | B1 | 5/2003 | Totsuka |
| 8,617,645 | B2 * | 12/2013 | Lee ................ B01D 69/12 427/171 |
| 9,728,792 | B2 | 8/2017 | Lee et al. |
| 10,355,299 | B2 | 7/2019 | Bae et al. |
| 2007/0059574 | A1 | 3/2007 | Kim et al. |
| 2008/0063917 | A1 | 3/2008 | Yamashita et al. |
| 2009/0209668 | A1 | 8/2009 | Lee et al. |
| 2014/0004405 | A1 * | 1/2014 | Kim .................. H01M 50/403 429/144 |
| 2014/0120431 | A1 | 5/2014 | Roelofs et al. |
| 2014/0154594 | A1 | 6/2014 | Lee et al. |
| 2014/0370404 | A1 | 12/2014 | Kato et al. |

FOREIGN PATENT DOCUMENTS

| | | |
|---|---|---|
| JP | 2000-58085 A | 2/2000 |
| JP | 2005-243494 A | 9/2005 |
| JP | 2007-188656 A | 7/2007 |
| KR | 10-2009-0046087 A | 5/2009 |
| KR | 10-2013-0049077 A | 5/2013 |
| KR | 10-1330571 B1 | 11/2013 |
| KR | 10-2014-0043117 A | 4/2014 |
| KR | 10-2015-0107948 A | 9/2015 |
| KR | 10-1639536 B1 | 7/2016 |
| KR | 10-2017-0029235 A | 3/2017 |
| KR | 10-2017-0064837 A | 6/2017 |
| WO | WO 2013/100083 A1 | 7/2013 |
| WO | WO 2019/025897 A1 | 2/2019 |

\* cited by examiner

[FIG. 1]
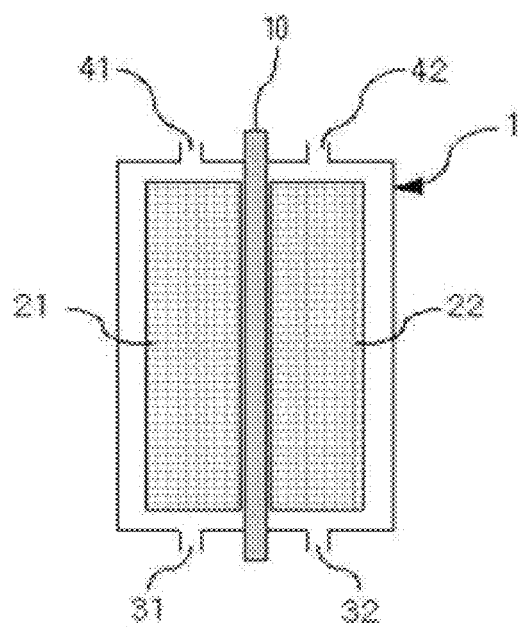

[FIG. 2]
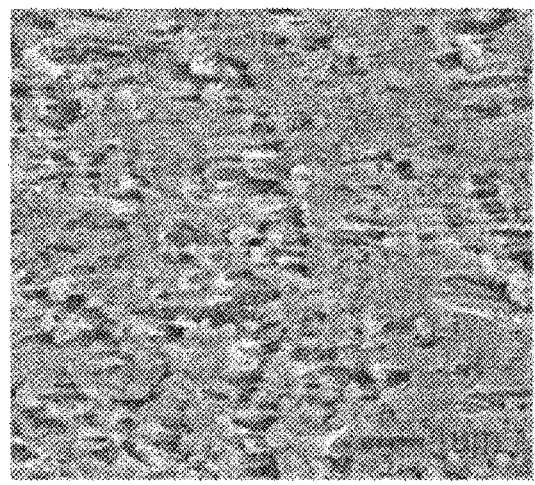
[FIG. 3]
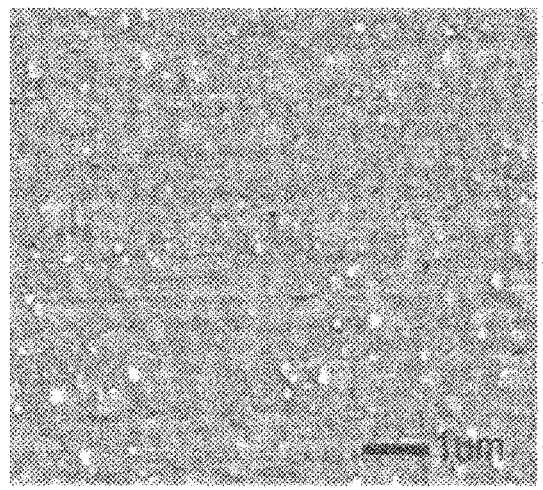

[FIG. 4]
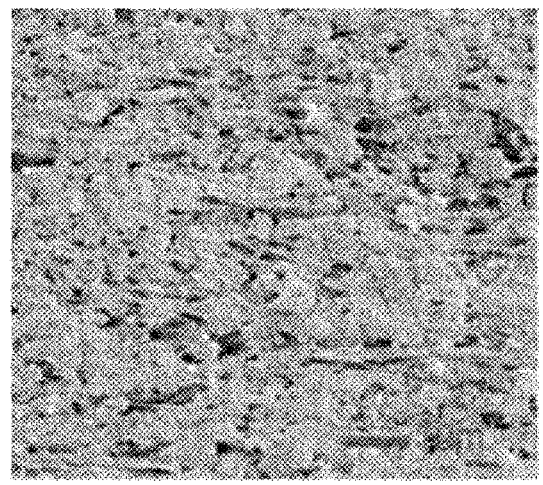

[FIG. 5]
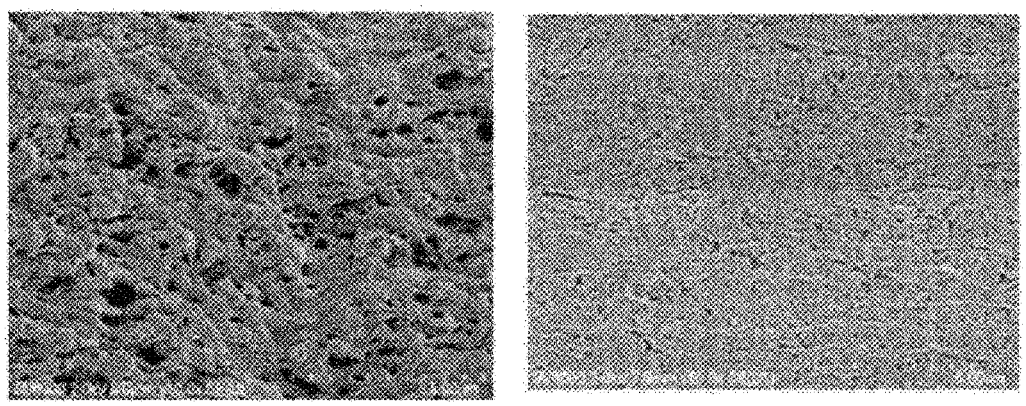
[FIG. 6]
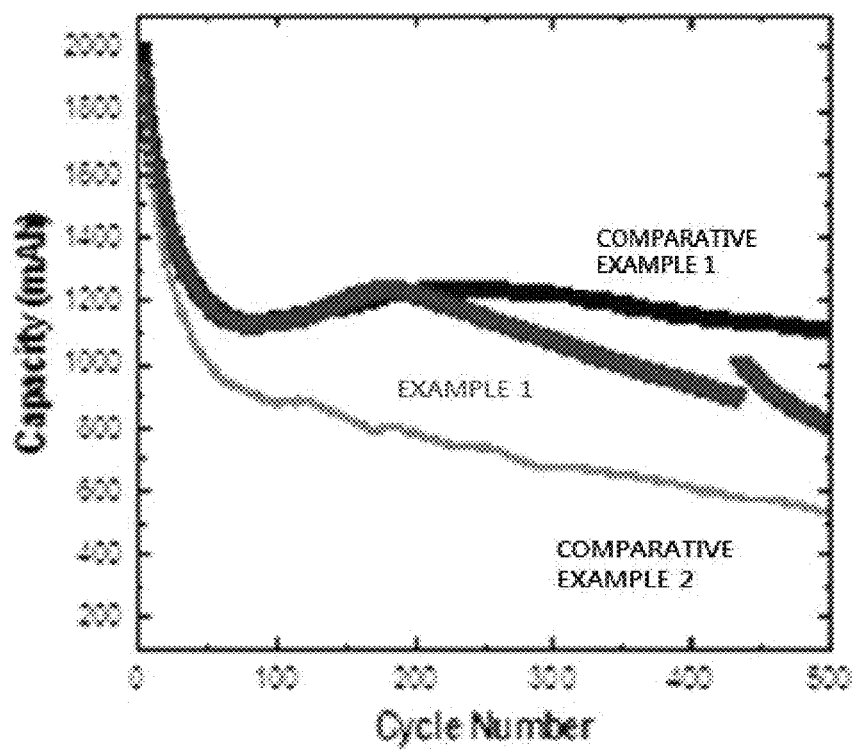

[FIG. 7]
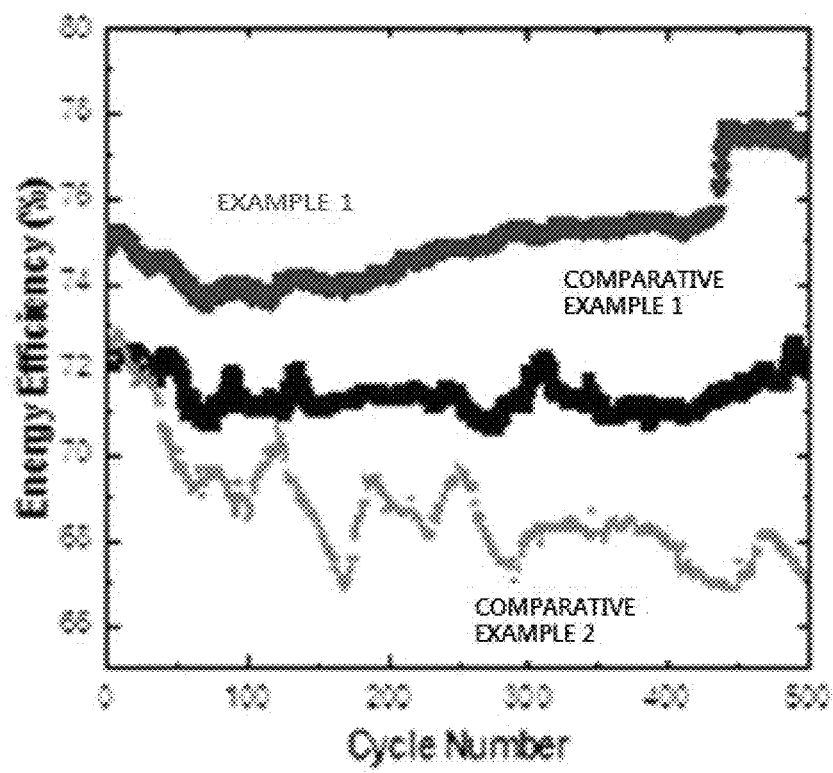

METHOD FOR MANUFACTURING REINFORCED SEPARATOR, REINFORCED SEPARATOR MANUFACTURED USING THE SAME AND REDOX FLOW BATTERY

TECHNICAL FIELD

The present specification relates to a method for manufacturing a reinforced separator, a reinforced separator manufactured using the same, and a redox flow battery.

This application claims priority to and the benefits of Korean Patent Application No. 10-2018-0003222, filed with the Korean Intellectual Property Office on Jan. 10, 2018, the entire contents of which are incorporated herein by reference.

BACKGROUND ART

Power storage technology is an important technology for efficient use across the whole energy such as efficiency of power usage, enhancing capability or reliability of a power supply system, expansion of introduction of new and renewable energy with large variation over time, or energy recovery of a moving body, and its development potential and demands for social contribution have been increasing.

Studies on secondary batteries have been actively progressed in order to adjust a supply-demand balance of semi-autonomous regional power supply systems such as microgrids and properly distribute an uneven output of new and renewable energy generation such as wind or sunlight generation, and to control effects of voltages and frequency fluctuations occurring from differences with existing power systems, and expectations for secondary battery utilization in such fields are increasing.

When examining properties required for secondary batteries to be used for large capacity power storage, energy storage density needs to be high, and as a high capacity and high efficiency secondary battery most suited for such properties, a flow battery has received most attention.

The most important component in a flow battery is a cation-exchangeable polymer electrolyte membrane, and studies have been progressed in a direction of securing high cation conductivity for efficient battery driving.

DISCLOSURE

Technical Problem

The present specification is directed to enhancing battery performance by increasing selective ion permeability of a reinforced separator and preventing a crossover phenomenon of an electrolyte liquid by, through enhancing affinity between a hydrophobic porous support and a hydrophilic ionic polymer, increasing an impregnation rate of the ionic polymer in the porous support when pretreating the reinforced separator.

Technical Solution

One embodiment of the present specification provides a method for manufacturing a reinforced separator comprising pretreating a porous support using a first solution comprising an ionic polymer and ethanol; and impregnating a second solution comprising an ionic polymer and a solvent into the pretreated porous support, wherein a concentration of the first solution is lower than a concentration of the second solution.

Another embodiment of the present specification provides M a reinforced separator manufactured using the above-described manufacturing method.

Still another embodiment of the present specification provides a redox flow battery comprising the reinforced separator.

Advantageous Effects

Manufacturing a reinforced separator using a manufacturing method of the present disclosure is capable of enhancing an impregnation rate of a hydrophilic ionic polymer into a porous support exhibiting hydrophobicity. In addition, by preventing electrolyte liquid active ions through the reinforced separator, active ion permeability can be lowered, and a crossover phenomenon of the electrolyte liquid can be prevented.

DESCRIPTION OF DRAWINGS

FIG. 1 is a sectional diagram illustrating a general structure of a flow battery.

FIG. 2 is a surface view of a reinforced separator according to one example of the present specification.

FIG. 3 is a surface view of a reinforced separator according to another example of the present specification.

FIG. 4 is a surface view of a reinforced separator manufactured by pretreating a porous support using ethanol only.

FIG. 5 shows a cross-sectional view of a porous support before impregnating an ionic polymer and a cross-sectional view of an ionic polymer-impregnated reinforced separator according to one example of the present specification in consecutive order.

FIG. 6 is a diagram showing discharge capacity of one example and comparative examples of the present disclosure.

FIG. 7 is a diagram showing energy efficiency of one example and comparative examples of the present disclosure.

MODE FOR DISCLOSURE

Hereinafter, the present specification will be described in more detail.

In the present specification, a description of a certain part "comprising" certain constituents means capable of further comprising other constituents, and does not exclude other constituents unless particularly stated on the contrary.

One embodiment of the present disclosure provides a method for manufacturing a reinforced separator comprising pretreating a porous support with a first solution comprising a first ionic polymer and ethanol; and impregnating a second solution comprising a second ionic polymer and a solvent into the pretreated porous support, wherein a concentration of the first ionic polymer of the first solution is lower than a concentration of the second ionic polymer of the second solution.

Manufacturing a reinforced separator using the manufacturing method of the present disclosure may increase an ionic polymer impregnation rate of the reinforced separator. Increasing an ionic polymer impregnation rate may effectively transfer hydrogen ions, and may prevent migration of active ions of an electrolyte liquid. As a result, selective ion permeability of the separator may increase.

As a material of the reinforced separator, an ionic polymer such as Nafion is typically used, however, a pure separator manufactured with just Nafion is high-priced, has low mechanical strength, and has low selective ion permeability as well, and has a limit to be used as a separator of a battery that drives for a long period of time. In order to overcome such a limit, a reinforced separator is manufactured by impregnating an ionic polymer into a porous support comprising a base, a reinforcing material.

By manufacturing a reinforced separator through impregnating an ionic polymer into a porous support, mechanical strength of the separator may be enhanced, and durability and selective permeability may also be enhanced. In addition, manufacturing costs are low compared to pure membranes, which leads to an advantage of being economical. However, an ionic polymer may fall off from a porous support when driving a battery for a long period of time, and a method of effectively impregnating an ionic polymer into nano-size pores of a porous support is required.

The present disclosure increases an impregnation rate of an ionic polymer in a porous support by enhancing affinity between the porous support and the ionic polymer.

Existing pretreatment methods include a method of making a porous support temporarily hydrophilic by spraying ethanol on the hydrophobic porous support. In addition, there is a method of dipping a porous support into a solution adding glycerol to ethanol. The method of pretreatment by spraying ethanol on a porous support may make the porous support hydrophilic, however, when dipping the pretreated porous support into a hydrophilic polymer solution later, a concentration of the hydrophilic polymer solution may decrease. Particularly, when manufacturing a reinforced separator using a continuous process by roll-to-roll, a concentration of the hydrophilic polymer solution may be greatly reduced, and an impregnation rate of the ionic polymer may decrease. In addition, the method of pretreatment by dipping a porous support into a solution adding glycerol to ethanol may have the glycerol remaining in the reinforced separator after the pretreatment causing side-effects to the separator.

However, by the present disclosure pretreating a porous support using a first solution comprising an ionic polymer and ethanol, affinity between the hydrophobic porous support and the hydrophilic ionic polymer may be enhanced without reducing a concentration of the hydrophilic polymer solution to impregnate after the pretreatment, and an impregnation rate of the ionic polymer may increase.

The ionic polymer included in the first solution of the present disclosure is dispersed into ethanol in a powder state. After that, the first solution may be filtered using a filter as necessary, and used in the pretreating.

In other words, in the present specification, the first ionic polymer included in the first solution is in a powder state.

In one embodiment of the present specification, the pretreating may be performed by spraying or dipping the first solution on the porous support or dipping the porous support into the first solution. Preferably, the first solution may be sprayed on the porous support. The spraying or dipping may be carried out for greater than 0 minutes and less than or equal to 3 minutes at 20° C. to 25° C. In the above-mentioned range, an impregnation rate of the ionic polymer may be enhanced by maximizing the pretreatment effect. When the temperature is higher than 25° C. or the time is longer than 3 minutes in the pretreating, the alcohol may evaporate reducing the pretreatment effect.

In one embodiment of the present specification, the second solution may have the ionic polymer dispersed into the solvent, and is a hydrophilic polymer solution. The hydrophilic polymer solution may be prepared by dispersing the ionic polymer into the solvent in a powder state. When the ionic polymer is dispersed into the solvent in a powder state, aggregation may occur between the ionic polymers reducing a degree of ionic polymer dispersion into the solvent. Nevertheless, the present disclosure pretreats the porous support using the first solution, and therefore, may increase affinity between the porous support and the ionic polymer, and, when impregnating the second solution into the ionic polymer, an impregnation rate of the ionic polymer may further increase.

In one embodiment of the present specification, a concentration of the first solution is lower than a concentration of the second solution.

The concentration means a content of the ionic polymer included in the solution according to the present specification. The concentration may mean a percent concentration.

In one embodiment of the present specification, a content of the first ionic polymer of the first solution is from 1% by weight to 5% by weight and preferably from 1% by weight to 3% by weight with respect to a total weight of the first solution. In addition, a content of the second ionic polymer of the second solution may be from 10% by weight to 40% by weight and preferably from 15% by weight to 25% by weight with respect to a total weight of the second solution. When performing pretreatment using the first solution comprising an ionic polymer in a low concentration according to the above-mentioned weight range and impregnating the second solution comprising an ionic polymer in a high concentration into the porous support, a decrease in the concentration of the second solution may be reduced, and affinity between the porous support and the ionic polymer may be enhanced.

In one embodiment of the present specification, a difference between the concentration of the first ionic polymer of the first solution and the concentration of the second ionic polymer of the second solution may be from 5% by weight to 39% by weight. The difference in the percent concentration may be preferably from 10% by weight to 24% by weight. When satisfying the above-mentioned concentration difference range, an impregnation rate of the ionic polymer into the porous support obtained from the pretreating may increase.

In one embodiment of the present specification, the impregnating of a second solution may be performed by dipping the pretreated porous support into the second solution. Specifically, the pretreatment porous support may be dipped into the second solution for 1 minute to 20 minutes and preferably for 5 minutes to 10 minutes at 20° C. to 25° C. As necessary, after the impregnating of a second solution, drying the result for 24 hours at room temperature may be further included.

In one embodiment of the present specification, the solvent included in the second solution is a hydrophilic solvent.

In one embodiment of the present specification, the solvent included in the second solution may be a hydrophilic solvent such as water, dimethylacetamide (DMAc) or dimethyl sulfoxide (DMSO), but is not limited thereto, and those generally used in the art may be used. The solvent included in the second solution does not include alcohols such as ethanol included in the first solution.

In one embodiment of the present specification, the first and second ionic polymers may independently be a fluorine-based polymer, a hydrocarbon-based polymer or a partial fluorine-based polymer. Examples of the fluorine-based polymer may include Nafion (Dupont), Aquivion (Solvay), 3M Ionomer (ionomer of 3M) or the like. Examples of the hydrocarbon-based polymer may include sulfonated polyetherketone (S-PEEK) or sulfonated polyaryletherketone (S-PAEK). In addition, examples of the ionic polymer may include polyethylene oxide (PEO) or polyvinyl alcohol (PVA). The ionic polymer may be an ion conducting polymer. The ion conducting polymer is not particularly limited as long as it is a material capable of ion exchange, and those generally used in the art may be used.

In one embodiment of the present specification, the first ionic polymer included in the first solution and the second ionic polymer included in the second solution may be the same as each other or different from each other, e.g., they may be of the same type or a different type series. In another embodiment, the ionic polymer included in the first solution and the ionic polymer included in the second solution are the same type, and may be a fluorine-based polymer. When the ionic polymer included in the first solution and the ionic polymer included in the second solution are the same type, an impregnation rate of the ionic polymer of the reinforced separator according to one embodiment of the present disclosure may further increase. In one embodiment, the ionic polymer included in the first solution may be an ionomer of 3M, and the ionic polymer included in the second solution may be Aquivion (Solvay). The hydrocarbon-based polymer may be a hydrocarbon-based sulfonated polymer without a fluorine group, and on the contrary, the fluorine-based polymer may be a sulfonated polymer saturated with a fluorine group, and the partial fluorine-based polymer may be a sulfonated polymer not saturated with a fluorine group.

In addition, the ion conducting polymer may be one, two or more polymers selected from the group consisting of sulfonated perfluorosulfonic acid-based polymers, sulfonated hydrocarbon-based polymers, sulfonated aromatic sulfone-based polymers, sulfonated aromatic ketone-based polymers, sulfonated polybenzimidazole-based polymers, sulfonated polystyrene-based polymers, sulfonated polyester-based polymers, sulfonated polyimide-based polymers, sulfonated polyvinylidene fluoride-based polymers, sulfonated polyethersulfone-based polymers, sulfonated polyphenylene sulfide-based polymers, sulfonated polyphenylene oxide-based polymers, sulfonated polyphosphazene-based polymers, sulfonated polyethylene naphthalate-based polymers, sulfonated polyester-based polymers, doped polybenzimidazole-based sulfonated polymers, sulfonated polyetherketone-based polymers, sulfonated polyphenylquinoxaline-based polymers, sulfonated polysulfone-based polymers, sulfonated polypyrrole-based polymers and sulfonated polyaniline-based polymers. The polymer may be a single copolymer, an alternating copolymer, a random copolymer, a block copolymer, a multiblock copolymer or a graft copolymer, but is not limited thereto.

The ion conducting polymer may be a cation conducting polymer, and for example, may include at least one of Nafion, sulfonated polyetheretherketone (sPEEK) sulfonated polyetherketone (sPEK), poly(vinylidene fluoride)-graft-poly(styrene sulfonic acid) (PVDF-g-PSSA) and sulfonated poly(fluorenyletherketone).

The ion conducting polymer may have a weight average molecular weight of thousands to tens of millions. Specifically, the polymer may have a weight average molecular weight of greater than or equal to 1,000 g/mol and less than or equal to 10,000,000 g/mol, however, the weight average molecular weight is not limited thereto.

The size of the holes of the porous support is not particularly limited as long as mechanical properties required during the process are maintained, however, the hole size may be greater than or equal to 1 mm and less than or equal to 10 cm.

Based on the width of the porous support, the percentage of the hole size may be greater than or equal to 0.1% and less than or equal to 10%. This has advantages in that the porous support are held tight, and a loss of the reinforced separator manufactured using the porous support may be reduced as well.

The shape of the multiple holes of the porous support may be circular, oval or polygonal. The polygon means a figure surrounded by tree or more line segments, and may be a triangle, a rectangle, a pentagon, a hexagon or the like depending on the number of sides, and is not particularly limited.

In the multiple holes arranged on both sides of the porous support, a distance between adjacent holes is not particularly limited as long as mechanical properties required during the process are maintained, however, the distance between adjacent holes may be greater than or equal to 1 mm and less than or equal to 10 cm. The distance between holes means a distance between any one hole and a center of another hole neighboring a center of the any one hole. Based on the distance between holes, the hole size percentage may be greater than or equal to 1% and less than or equal to 100%.

In the present specification, the porous support is not particularly limited in the support structures and materials as long as it includes multiple pores, and those generally used in the art may be used. For example, at least one of poly imide (PI), polysulfone (PSF), polybenzimidazole (PBI), Nylon, polyethylene terephthalate (PET), polytetrafluoroethylene (PTFE), polyethylene (PE), polypropylene (PP), poly(arylene ether sulfone) (PAES), polyetheretherketone (PEEK), polyaramide, fluorine-based (fluorinated) ethylene propylene (FEP), poly(ethene-co-tetrafluoroethene), polychlorotrifluoroethylene (PCTFE), polyvinylidene fluoride (PVDF) and perfluoroalkoxy polymers (PFA) may be included.

Although the thickness of the porous support is not particularly limited, the thickness of the porous support may be greater than or equal to 1 μm and less than or equal to 500 μm.

Although the width of the porous support is not particularly limited, the width of the porous support may be greater than or equal to 10 cm and less than or equal to 10 m.

The porous support may include a porous metal including at least one of Au, Sn, Ti, Pt—Ti and IrO—Ti; or porous carbon including at least one of carbon paper, carbon nanotube, graphite felt and carbon felt.

In one embodiment of the present specification, the method for manufacturing a reinforced separator may include, after the impregnating of a second solution into the pretreated porous support, drying the result. The drying may be performed using a hot plate or a vacuum oven at 70° C. to 230° C. Specifically, the drying may be performed step-wise for 3 days at 80° C., 6 hours at 180° C., and 4 minutes at 200° C. Among the fluorine-based polymers, Nafion may be sufficiently dried when drying for 3 days at 80° C., however, as for Aquivion used in one embodiment of the present disclosure, the drying needs to be performed step-wise for 3 days at 80° C., 6 hours at 180° C., and 4 minutes at 200° C. in order to prevent the ionic polymer impregnated into the porous support from being washed away by water when used in a flow battery.

One embodiment of the present specification may provide a reinforced separator having an enhanced ionic polymer impregnation rate by using the manufacturing method described above.

In one embodiment of the present disclosure, the impregnation amount of the ionic polymer of the reinforced separator manufactured using the above-described manufacturing method may be from 0.4 g to 0.5 g based on the reinforced separator having a size of 8 cm width×8 cm length and 50 μm thickness. Specifically, the impregnation amount of the ionic polymer may be from 0.45 g to 0.5 g. The thickness is not limited to the above-described range, and may vary depending on reinforced separator applications, or battery driving environments such as current density or voltage. The impregnation amount of the ionic polymer may be calculated by subtracting a weight of the porous support before using the manufacturing method of the present disclosure from a weight of the reinforced separator manufactured using the manufacturing method of the present disclosure. Due to such a high impregnation amount of the ionic polymer as in the above-mentioned range, ion conductivity of the reinforced separator may increase, and efficient battery driving may be obtained.

The reinforced separator manufactured using the manufacturing method of the present disclosure may have porosity of greater than or equal to 0% and less than or equal to 1%. Preferably, the porosity may be 0%. The porosity means a ratio occupied by voids with respect to a total volume of the reinforced separator. The reinforced separator manufactured using the manufacturing method of the present disclosure may hardly include voids by going through the pretreating.

One embodiment of the present specification provides a redox flow battery comprising the reinforced separator. The redox flow battery may be a vanadium redox flow battery.

The redox flow battery manufactured using one embodiment of the present specification may have ion conductivity of 0.038 S/cm or greater. In another embodiment, the ion conductivity may be 0.040 S/cm or greater. In another embodiment, the ion conductivity may be from 0.038 S/cm to 0.050 S/cm, but is not limited thereto. Meanwhile, a redox flow battery manufactured using a separator that does not include pretreating the porous support using the first solution according to one embodiment of the present disclosure has ion conductivity of 0.032 S/cm or less. In other words, the reinforced separator going through the pretreating of the present disclosure has a higher ionic polymer impregnation rate compared to the separator that does not go through the pretreating, and the flow battery comprising the reinforced separator of the present disclosure has higher ion conductivity, which is more efficient for battery driving.

In one embodiment of the present specification, the reinforced separator is a membrane comprising a porous base and capable of exchanging ions, and may mean an ion exchange membrane, an ion transfer membrane, an ion conducting membrane, a separator, an ion exchange separator, an ion transfer separator, an ion conducting separator, an ion exchange electrolyte membrane, an ion transfer electrolyte membrane, an ion conducting electrolyte membrane or the like.

The redox flow battery (oxidation-reduction flow battery, redox flow battery) is a system charged and discharged by active materials included in an electrolyte liquid being oxidized and reduced, and is an electrochemical storage device directly storing chemical energy of the active materials as electric energy.

The redox flow battery may include a negative electrode in which a negative electrode electrolyte liquid including a negative electrode active material is injected and discharged; a positive electrode in which a positive electrode electrolyte liquid including a positive electrode active material is injected and discharged; and a separator disposed between the negative electrode and the positive electrode.

In FIG. 1, the redox flow battery may further include a housing (1); a negative electrode tank and a positive electrode tank storing the negative electrode electrolyte liquid or the positive electrode electrolyte liquid, respectively; a pump connected to the negative electrode tank and the positive electrode tank to supply the electrolyte liquids to the negative electrode or the positive electrode; a separator (10); a negative electrode inlet (31) and a positive electrode inlet (32) inflowing the negative electrode electrolyte liquid or the positive electrode electrolyte liquid, respectively, from the pump; and a negative electrode outlet (41) and a positive electrode outlet (42) discharging the electrolyte liquids from the negative electrode (21) or the positive electrode (22), respectively, to the negative electrode tank and the positive electrode tank.

The shape of the flow battery is not limited, and examples thereof may include a coin-type, a flat plate-type, a cylinder-type, a horn-type, a button-type, a sheet-type or a laminate-type.

The negative electrode means a region capable of charging and discharging electric energy by chemically reacting while the negative electrode electrolyte liquid is injected and discharged from the tank, and the positive electrode means a region capable of charging and discharging electric energy by chemically reacting while the positive electrode electrolyte liquid is injected and discharged from the tank.

The negative electrode electrolyte liquid and the positive electrode electrolyte liquid may each include an electrolyte and a solvent. The electrolyte and the solvent are not particularly limited, and those generally used in the art may be employed.

For example, the redox flow battery may use a V(IV)/V(V) redox couple as the positive electrode electrolyte, and may use a V(II)/V(III) redox couple as the negative electrode electrolyte.

The redox flow battery may use a halogen redox couple as the positive electrode electrolyte, and may use a V(II)/V(III) redox couple as the negative electrode electrolyte.

In one embodiment of the present specification, the redox flow battery may have residual capacity of 29% or greater. The residual capacity may be specifically from 29% to 100%, and more specifically from 63% to 100%. The redox flow battery may have current efficiency of 95% or greater at a 200 cycle. The current efficiency may be specifically from 95% to 100%, and more specifically from 96% to 100%. In addition, the redox flow battery may have voltage efficiency of 74% or greater at a 200 cycle. The voltage efficiency may be specifically from 74% to 100%, and more specifically from 76% to 100%. The redox flow battery may have energy efficiency of 71% or greater at a 200 cycle. The energy efficiency may be specifically from 71% to 100%, and more specifically from 74% to 100%. Satisfying the above-mentioned range may allow efficient flow battery driving.

In the present specification, impregnation means an ionic polymer penetrating into a base. The impregnation in the present specification may be performed on the second solution by dipping, slot dye coating, bar casting and the like the base.

In the present specification, the dipping may be expressed as a term such as dip coating or dipping method.

In the present specification, the redox flow battery uses a principle of being charged and discharged from the exchange of electrons occurring when liquid electrolytes comprising active materials in different oxidation states meet with an ion-exchange membrane in between. A redox flow battery is generally formed with a tank holding a liquid electrolyte, a battery cell where charge and discharge occur, and a circulating pump for circulating the liquid electrolyte between the tank and the battery cell, and a unit cell of the battery cell includes an electrode, an electrolyte and a separator.

When using the reinforced separator according to one embodiment of the present specification as the separator of the redox flow battery, the above-described effects may be obtained.

The redox flow battery of the present specification may be manufactured using common methods known in the art except that the redox flow battery includes the reinforced separator according to one embodiment of the present specification.

Hereinafter, the present specification will be described in detail with reference to examples. However, examples according to the present specification may be modified to various other forms, and the scope of the present specification is not to be construed as being limited to the examples described below. Examples of the present specification are provided in order to more fully describe the present specification to those having average knowledge in the art.

Example 1

A first solution was prepared by mixing, with respect to a total weight of a first solution including an ionomer ionic polymer of 3M and ethanol, 1% by weight of the ionomer ionic polymer powder of 3M with the ethanol. The prepared first solution was sprayed on a porous support for 3 minutes at 20° C. to 25° C. for pretreatment. As the porous support, polytetrafluoroethylene (PTFE) was used.

A structure of the ionomer ionic polymer of 3M is as follows.

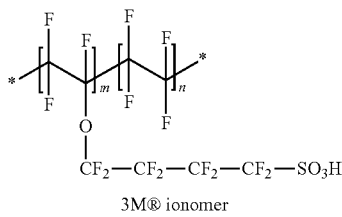

3M® ionomer

In the structure, an equivalent weight (EW) of the polymer structure per one sulfonic acid group (—$SO_3H$) was 850 g, and n/m was 4.7. After that, a second solution was prepared by mixing, with respect to a total weight of a second solution including an Aquivion (Solvay) ionic polymer and water, mixing 25% by weight of the ionic polymer and the water. The pretreated porous support was dipped into the second solution for 5 minutes to 10 minutes at 20° C. to 25° C. to impregnate the Aquivion (Solvay) ionic polymer. A structure of the Aquivion (Solvay) ionic polymer is as follows.

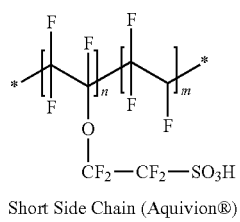

Short Side Chain (Aquivion®)

In the structure, an equivalent weight (EW) of the polymer structure per one sulfonic acid group (—$SO_3H$) was 830 g, and n/m was 5.5. After that, the Aquivion (Solvay) ionic polymer-impregnated reinforced separator was dried stepwise for 3 days at 80° C., 6 hours at 180° C. and 4 minutes at 200° C. to manufacture a reinforced separator.

An end cell evaluation was performed on a redox flow battery including the manufactured reinforced separator.

Example 2

A reinforced separator was manufactured in the same manner as in Example 1 except that the ionomer ionic polymer powder of 3M was used in 5% by weight with respect to the total weight of the first solution, and an end cell evaluation was performed on a redox flow battery including the reinforced separator.

Comparative Example 1

A reinforced separator was manufactured in the same manner as in Example 1 except that only ethanol was used instead of the first solution, and an end cell evaluation was performed on a redox flow battery including the reinforced separator.

Comparative Example 2

An end cell evaluation was performed on a redox flow battery including Nafion, a pure separator. As the pure separator, a Nafion212 product having a thickness of 50 µm and formed only with an ionic polymer represented by the following structure without including a porous base was used.

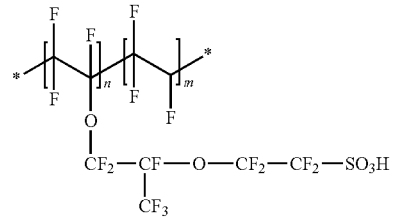

Long Side Chain (Nafion®, Fumion®)

In the structure, an equivalent weight (EW) of the polymer structure per one sulfonic acid group (—$SO_3H$) was 1100 g, and n/m was 6.6. Results of end cell performance evaluation performed on the redox flow batteries of Example 1, and Comparative Examples 1 and 2 are described in the following Table 1.

TABLE 1

| | Ion Conductivity | Residual Capacity | 200 Cycle Average Efficiency (%) | | |
|---|---|---|---|---|---|
| | S/cm | (%) | Current | Voltage | Energy |
| Example 1 | 0.040 | 63.387 | 96.46596 | 76.84334 | 74.12541 |
| Example 2 | 0.038 | 29.012 | 95.94049 | 74.02437 | 71.01766 |
| Comparative Example 1 | 0.032 | 64.127 | 96.87995 | 72.02343 | 69.77152 |
| Comparative Example 2 | 0.032 | 41.158 | 96.40695 | 72.2219 | 69.62189 |

As shown in the results of Table 1, it was identified that performance of the redox flow battery including the reinforced separator manufactured according to one embodiment of the present disclosure was enhanced. Specifically, it was identified that Examples 1 and 2 had higher ion conductivity, voltage efficiency and energy efficiency compared to Comparative Examples 1 and 2. In addition, it was seen that Example 1 had higher battery residual capacity and current efficiency compared to Comparative Example 2.

Accordingly, it was identified that the reinforced separator manufactured according to one embodiment of the present specification had enhanced ionic polymer impregnation rate and ion conductivity, and the redox flow battery including the reinforced separator of the present disclosure exhibited superior performance.

FIG. 2 is a surface view of a reinforced separator manufactured by pretreating a porous support using a first solution having an ionic polymer content of 1% by weight with respect to a total weight of the first solution, and then impregnating a second solution having an ionic polymer content of 25% by weight with respect to a total weight of the second solution into the pretreated porous support.

FIG. 3 is a surface view of a reinforced separator manufactured by pretreating a porous support using a first solution having an ionic polymer content of 5% by weight with respect to a total weight of the first solution, and then impregnating a second solution having an ionic polymer content of 25% by weight with respect to a total weight of the second solution into the pretreated porous support.

FIG. 4 is a surface view of a reinforced separator manufactured by pretreating a porous support using ethanol without including an ionic polymer, and then impregnating a second solution having an ionic polymer content of 25% by weight with respect to a total weight of the second solution into the pretreated porous support.

Pores shown in FIGS. 2 and 3 had a smaller diameter compared to FIG. 4, and it was identified that an impregnation rate of the ionic polymer into the porous support was enhanced.

Pores shown in the reinforced separator of FIG. 2 had a larger diameter compared to FIG. 3, however, it was identified that the separator of FIG. 2 had a more uniform surface.

FIG. 5 shows a cross-sectional view of a porous support before impregnating an ionic polymer and a cross-sectional view of an ionic polymer-impregnated reinforced separator manufactured in Example 1, and it was identified that the reinforced separator after impregnation had no voids present whereas the porous support before impregnation had a plurality of voids present therein.

FIG. 6 shows residual capacity according to Example 1, and Comparative Examples 1 and 2 of the present disclosure, and it was seen that a decrease in the residual capacity of Example 1 was not large compared to Comparative Example 1, and in contrast, it was identified that a decrease in the residual capacity of Comparative Example 2 using Nafion, a pure membrane, was large.

FIG. 7 shows energy efficiency according to Example 1, and Comparative Examples 1 and 2 of the present disclosure, and it was identified that Example 1 had higher energy efficiency compared to Comparative Examples 1 and 2.

Hereinbefore, preferred embodiments of the present disclosure have been described, however, the present disclosure is not limited thereto, and various modifications may be implemented in the scope of the claims and the scope of the detailed descriptions of the disclosure, and these also fall within the category of the present disclosure.

REFERENCE NUMERAL

1: Housing
10: Separator
21: Negative Electrode
22: Positive Electrode
31: Negative Electrode Inlet
32: Positive Electrode Inlet
41: Negative Electrode Outlet
42: Positive Electrode Outlet

The invention claimed is:

1. A method for manufacturing a reinforced separator comprising:
    pretreating a porous support with a first solution comprising a first ionic polymer and ethanol to form a pretreated porous support; and
    impregnating a second solution comprising a second ionic polymer and a solvent into the pretreated porous support,
    wherein a concentration of the first ionic polymer in the first solution is lower than a concentration of the second ionic polymer in the second solution.

2. The method for manufacturing the reinforced separator of claim 1, wherein a content of the first ionic polymer of the first solution is from 1% by weight to 5% by weight with respect to a total weight of the first solution, and a content of the second ionic polymer of the second solution is from 10% by weight to 40% by weight with respect to a total weight of the second solution.

3. The method for manufacturing the reinforced separator of claim 1, wherein a difference between a percent concentration of the first ionic polymer of the first solution and a percent concentration of the second ionic polymer of the second solution is from 5% by weight to 39% by weight.

4. The method for manufacturing the reinforced separator of claim 1, wherein the first ionic polymer included in the first solution is in a powder state.

5. The method for manufacturing the reinforced separator of claim 1, wherein the pretreating is performed by spraying the first solution on the porous support or dipping the porous support into the first solution.

6. The method for manufacturing the reinforced separator of claim 1, wherein the impregnating of the second solution is performed by dipping the pretreated porous support into the second solution.

7. The method for manufacturing the reinforced separator of claim 1, wherein the solvent included in the second solution is a hydrophilic solvent.

8. The method for manufacturing the reinforced separator of claim 1, wherein the first and second ionic polymers are independently a fluorine-based polymer, a hydrocarbon-based polymer or a partial fluorine-based polymer.

9. The method for manufacturing the reinforced separator of claim 1, wherein the first ionic polymer included in the first solution and the second ionic polymer included in the second solution are the same as each other or different from each other.

10. The method for manufacturing the reinforced separator of claim 1, further comprising:
    after the impregnating of the second solution into the pretreated porous support, drying the pretreated porous support.

* * * * *